United States Patent
Saur et al.

(10) Patent No.: US 9,215,755 B2
(45) Date of Patent: Dec. 15, 2015

(54) BASE STATION AND METHOD OF OPERATING A BASE STATION

(75) Inventors: Stephan Saur, Stuttgart (DE); Hardy Halbauer, Ettlingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 214 days.

(21) Appl. No.: 13/880,588

(22) PCT Filed: Nov. 21, 2011

(86) PCT No.: PCT/EP2011/070511
§ 371 (c)(1),
(2), (4) Date: Apr. 19, 2013

(87) PCT Pub. No.: WO2012/100856
PCT Pub. Date: Aug. 2, 2012

(65) Prior Publication Data
US 2013/0295944 A1    Nov. 7, 2013

(30) Foreign Application Priority Data
Jan. 26, 2011    (EP) .................................. 11290043

(51) Int. Cl.
*H04W 72/00*     (2009.01)
*H04W 88/08*     (2009.01)
*H04W 16/28*     (2009.01)

(52) U.S. Cl.
CPC .............. *H04W 88/08* (2013.01); *H04W 16/28* (2013.01)

(58) Field of Classification Search
CPC ............................. H04W 88/08; H04W 16/28

USPC ........................................................... 455/450
See application file for complete search history.

(56) References Cited

U.S. PATENT DOCUMENTS

| 8,630,267 | B1 * | 1/2014  | Jin .................................. 370/332 |
| 2001/0020917 | A1 | 9/2001 | Hamada et al. |
| 2002/0187813 | A1 * | 12/2002 | Guo ................................ 455/562 |
| 2003/0035490 | A1 | 2/2003 | Gollamudi |
| 2004/0072579 | A1 | 4/2004 | Hottinen |

(Continued)

FOREIGN PATENT DOCUMENTS

| CN | 1838656 A | 9/2006 |
| EP | 2416603 A1 | 2/2012 |

(Continued)

OTHER PUBLICATIONS

English Bibliography for Taiwanese Patent Application Publication TW200824180A, published Jun. 1, 2008, printed from Thomson Innovation on Sep. 18, 2014, 3 pp.

(Continued)

*Primary Examiner* — Nathan Mitchell
(74) *Attorney, Agent, or Firm* — Fay Sharpe LLP

(57) ABSTRACT

The invention relates to a base station (100) for a cellular communications network, wherein said base station (100) is configured to control at least one antenna system (110) which comprises a plurality of antenna elements (110*a*, 110*b*, 110*c*, . . . , 110η), wherein at least two antenna elements (110*a*, 110*b*) are arranged at different vertical positions (pa, pb) with reference to a virtual horizontal plane (P). The base station (100) is further configured to transmit specific pilot signals (D1, D2) on orthogonal radio resources associated with said specific pilot signals (D1, D2) via different antenna elements (110*a*, 110*b*).

20 Claims, 2 Drawing Sheets

(56) References Cited

U.S. PATENT DOCUMENTS

| | | | |
|---|---|---|---|
| 2005/0084000 A1* | 4/2005 | Krauss et al. | 375/148 |
| 2006/0233270 A1 | 10/2006 | Ahn et al. | |
| 2007/0099578 A1* | 5/2007 | Adeney et al. | 455/69 |
| 2008/0192811 A1* | 8/2008 | Son | 375/219 |
| 2009/0203405 A1* | 8/2009 | Horneman et al. | 455/562.1 |
| 2009/0252251 A1* | 10/2009 | Tosato et al. | 375/267 |
| 2009/0285173 A1* | 11/2009 | Koorapaty et al. | 370/330 |
| 2009/0303955 A1 | 12/2009 | Teo et al. | |
| 2009/0312018 A1* | 12/2009 | Moulsley et al. | 455/435.1 |
| 2010/0097937 A1* | 4/2010 | Pietraski et al. | 370/241 |
| 2010/0112996 A1 | 5/2010 | Ho et al. | |
| 2010/0134359 A1 | 6/2010 | Manholm et al. | |
| 2010/0159930 A1 | 6/2010 | Hagerman et al. | |
| 2010/0304666 A1* | 12/2010 | Hottinen et al. | 455/7 |
| 2011/0006966 A1 | 1/2011 | Tanabe | |
| 2011/0103504 A1* | 5/2011 | Ma | 375/267 |
| 2011/0156974 A1* | 6/2011 | Kenington et al. | 343/763 |
| 2011/0194540 A1* | 8/2011 | Baligh et al. | 370/337 |
| 2013/0235807 A1* | 9/2013 | Lee et al. | 370/329 |
| 2013/0321207 A1* | 12/2013 | Monogioudis et al. | 342/373 |
| 2013/0336232 A1* | 12/2013 | Yang et al. | 370/329 |
| 2014/0029684 A1* | 1/2014 | Shirani-Mehr et al. | 375/267 |

FOREIGN PATENT DOCUMENTS

| | | | |
|---|---|---|---|
| GB | 2 378 858 A | 2/2003 | |
| JP | 2001237755 A | 8/2001 | |
| JP | 2006253977 A | 9/2006 | |
| JP | 2008216084 A | 9/2008 | |
| TW | 200824180 A | 6/2008 | |
| TW | 201001805 A | 1/2010 | |
| WO | WO 02/33998 A2 | 4/2002 | |

OTHER PUBLICATIONS

English Bibliography for Taiwanese Patent Application Publication TW201001805A, published Jan. 1, 2010, printed from Thomson Innovation on Sep. 18, 2014, 3 pp.

PCT Patent Application No. PCT/EP2011/070511, Written Opinion of the International Searching Authority, mailed Feb. 9, 2012, 6 pp.

European Patent Application No. 11290043.6, Extended European Search Report, mailed May 13, 2011, 7 pp.

International Search Report for PCT/EP2011/070511 dated Feb. 9, 2012.

English Bibliography for Japanese Patent Application Publication No. JP2001237755A, published Aug. 31, 2001, printed from Thomson Innovation on Nov. 11, 2014, 5 pp.

English Bibliography for Japanese Patent Application Publication No. JP2008216084A, published Sep. 18, 2008, printed from Thomson Innovation on Nov. 11, 2014, 3 pp.

English Bibliography for Chinese Patent Application Publication No. CN1838656A, published Sep. 27, 2006, printed from Thomson Innovation on Sep. 27, 2006, 4 pp.

English Bibliography for Japanese Patent Application Publication No. JP2006253977A, published Sep. 21, 2006, printed from Thomson Innovation on Jul. 8, 2015, 3 pp.

Artist4g; Advanced Ration InTerface Technologies for 4G SysTems; Innovative Advanced Signal Processing Algorithms for Interference Avoidance; Grant Agreement 247223; Dec. 31, 2010; 111 pp.

* cited by examiner

BASE STATION AND METHOD OF OPERATING A BASE STATION

FIELD OF THE INVENTION

The present invention relates to a base station for a cellular communications network, wherein said base station is configured to control at least one antenna system which comprises a plurality of antenna elements, wherein at least two antenna elements are arranged at different vertical positions with reference to a virtual horizontal plane.

The invention further relates to a method of operating a base station of the aforementioned type.

The present invention also relates to a terminal for a cellular communications network and a method of operating such terminal.

BACKGROUND

Antenna systems which are equipped with a plurality of vertically arranged antenna elements that can individually be supplied with respective transmit signals enable to adjust a resulting beam pattern of the antenna system in a vertical direction in a per se known manner. For instance, by applying a specific signal to a first antenna element of such antenna system, and by applying phase shifted copies of said first signal to the further antenna elements, a tilt angle of the antenna system may be electronically controlled.

However, the conventional approaches do not provide for an efficient determination of a tilt angle which is to be used by the base station for data communications with its terminals.

Accordingly, there is a need to provide an improved base station and method of operating such base station which ensure an efficient determination of a tilt angle to be used for communications. Moreover, a further object of the present invention is to provide a terminal for a cellular communications network which supports the aforedescribed operation of the base station.

SUMMARY

According to the present invention, regarding the above mentioned base station, this object is achieved by said base station being configured to transmit specific pilot signals on orthogonal radio resources associated with said specific pilot signals via different ones of said at least two antenna elements.

Employing orthogonal radio resources for transmitting pilot signals from the base station to one or more terminals advantageously enables the terminals to recover each individual pilot signal thus enabling an increased efficiency in synchronisation of the terminal with the base station and a flexibility of operation which may e.g. involve a determination of a desired tilt angle.

In contrast to conventional base stations, which do not employ orthogonal radio resources for transmission of specific pilot signals via different antenna elements, the inventive embodiments advantageously enable a terminal to determine phase shifts between different specific pilot signals that have been transmitted via different antenna elements of the antenna system of the base station from the base station to the terminal. Thus, from the phase shift information, the terminals may advantageously derive information as to an optimized tilt angle which may in future be used by the base station in order to reshape the vertical beam pattern of its antenna system so as to i.e. center it on the direction of the terminal as seen from the base station.

A particularly preferred embodiment proposes that said base station is configured to transmit a) a first pilot signal on a first radio resource via a first antenna element, and b) a second pilot signal on a second radio resource, which is orthogonal to said first radio resource, via a second antenna element. Thus, by employing different antenna elements for said two pilot signals, it is ensured that information on a phase shift between the pilot signals can be transferred to the terminal. Said phase shift inter alia depends on the wavelength employed for the radio frequency communication signals (i.e., pilot signals), and on constructive parameters of the antenna system (vertical distance of neighbouring antenna elements).

Using orthogonal radio resources is particularly advantageous since it enables to e.g. simultaneously supply the terminal with a plurality of pilot signals without losing phase information of the specific pilot signals, which is vital for assessing a desired tilt angle for data communications between the base station and the terminal.

According to a further advantageous embodiment, said base station is configured to employ at least one of the following resources as orthogonal radio resources: transmission time slots, subcarriers, orthogonal codes. Generally, any type of radio resource or coding technique may be employed which ensures that said specific pilot signals, which are transmitted via different antenna elements, can be recovered at a terminal maintaining their phase information. I.e., employing orthogonal radio resources in the sense of the present invention comprises any form of transmission and/or coding, which ensures that individual recovery and handling of specific pilot signals transmitted via different antenna elements is possible at the terminal side. Thus, conventional antenna systems which are capable of beam steering, e.g. by providing different antenna elements with phase-shifted instances of the same input signal, are not suitable for implementing the present embodiments since no orthogonal radio resources are provided due to the simultaneous transmission of phase-shifted signal instances via several antenna elements. Such transmissions do not enable a terminal to recover specific pilot signals associated with a single one of said antenna elements.

According to a further embodiment, said base station is configured to transmit a first pilot signal via a first antenna element during a first downlink transmission time slot, and to transmit a second pilot signal via a second antenna element during a second, preferably subsequent, downlink transmission time slot. In this embodiment, a time-multiplexed transmission of the different pilot signals is employed, i.e. "orthogonality" of radio resources—in the sense of the present invention—used for the different pilot signals is ensured by employing time multiplexing. Preferably, during transmission of the first pilot signal via a first antenna element, the other antenna elements of said antenna system are controlled to be passive, i.e. not transmitting any signals. The same holds true for transmitting further pilot signals. Thus, the respective time slots are to be reserved for transmitting the pilot signals.

To maintain a sufficient precision regarding an evaluation of a phase shift between the received pilot signals at the terminal side, it is advantageous for the base station to transmit pilot signals associated with different antenna elements with a minimum possible delay in between, i.e. preferably in subsequent downlink transmission time slots.

However, if the base station determines that a relative speed between the specific terminal and the base station does not exceed a predefined threshold value, it is also possible to admit larger delays between the transmission of subsequent pilot signals which are transmitted via different antenna elements, because the phase delay measurements of pilot signals received from different antenna elements at the terminal side are not significantly affected due to the low relative speed.

According to a further embodiment, said base station is configured to transmit a first pilot signal via a first antenna element on a first sub carrier, and to transmit a second pilot signal via a second antenna element on a second subcarrier, wherein said first and second pilot signals are preferably transmitted simultaneously.

According to the present embodiment, frequency subcarriers are employed as "orthogonal radio resource" which advantageously enables the terminal which is receiving the pilot signals transmitted via different antenna elements to recover the specific pilot signals including their phase information. In contrast to time-multiplexed transmission of various pilot signals, the present embodiment enables to simultaneously transmit different pilot signals by employing various different frequency subcarriers. However, in order to ensure that phase information sufficient for determining an optimized tilt angle for the base station's transmissions can be conveyed to the terminal, the various pilot signals still have to be transmitted via different antenna elements of the antenna system.

According to a further advantageous embodiment, said base station is configured to transmit a first pilot signal via a first antenna element using a first spreading code, and to transmit a second pilot signal via a second antenna element using a second spreading code, which is orthogonal to said first spreading code, wherein said first and second pilot signals are preferably transmitted simultaneously.

According to the present embodiment, code division multiplexing technique is employed to ensure that a plurality of pilot signals may be transmitted from the base station to one or more terminals without interfering with each other.

A combination of the aforementioned variants of employing orthogonal radio resources for supplying a terminal with a plurality of pilot signals via different antenna elements of the base station is also possible as long as the various techniques do not interfere with each other.

According to a further particularly advantageous embodiment, the first pilot signal is identical to the second pilot signal. This allows for an efficient detection of the pilot signal within the terminal and a correspondingly efficient determination of phase information which characterizes a phase difference of the various pilot signals which have been transmitted to a terminal via different antenna elements from the base station.

Alternatively or in addition, different pilot signals may also be used, wherein, as usual, it is to be ensured that both the receiving terminal and the base station comprise information on the properties of the respective pilot signals.

According to a further embodiment, the base station is configured to receive feedback information from a terminal, wherein said feedback information depends on or characterizes a phase shift between said pilot signals as detected by said terminal, and to control a tilt angle for downlink and/or uplink transmissions to/from said terminal depending on said feedback information.

The phase shift(s) determined by a terminal that has received various pilot signals that have been transmitted by a base station according to the embodiments may advantageously be employed to draw conclusions upon the preferred tilt angle of the base station's antenna system, i.e. the shape of the vertical beam pattern implemented by the antenna system under control of the base station. I.e., from the phase shift(s), the terminal (and/or the base station) may determine a terminal-individual tilt angle which is to be implemented by the base station for future downlink/uplink data transmissions to said terminal in order to ensure that all transmit signals originating at the different antenna elements of the antenna system arrive at said terminal with basically no relative phase difference. This situation is given if the tilt angle of the antenna system is configured such that a direction of a main lobe of the antenna characteristic of the antenna system coincides with the direction of the respective terminal as seen from the base station. In other words, by evaluating the phase shift information of the received pilot signals, an optimum tilt angle can be calculated which will center the main lobe of the antenna system's beam pattern to the terminal that has determined said phase shift information. The calculation of the tilt angle may be performed by the terminal and/or the base station. It is evident that at least two pilot signals (each being transmitted from another antenna element) have to be evaluated for determining said optimum tilt angle. More than two pilot signals (e.g. involving transmissions from further antenna elements) may also be used to increase precision.

According to particularly advantageous embodiment, said feedback information depends on the phase shift between different pilot signals as received by the terminal and is determined locally within the terminal.

After receiving respective feedback information from a terminal, a base station according to the embodiments may reshape the vertical beam pattern of its antenna system for future data transmissions to the respective terminal so as to implement the desired tilt angle.

According to a further advantageous variant, the tilt angle of the base station's antenna system may not only be configured to a desired value for downlink transmissions, but rather also for uplink transmissions. I.e., for receiving data communications from a terminal, the base station may also configure its antenna system respectively regarding a tilt angle. Due to the reciprocity of the radio channel between the base station and the terminal, the base station may advantageously employ the same tilt angle for uplink data transmissions as has been determined for downlink data transmissions.

However, according to a further embodiment, it may also be advantageous to use different tilt angle values for uplink transmissions and downlink transmissions with a specific terminal. For instance, if a terminal currently served by a first base station is roaming within the radio cell provided by the base station, the terminal may happen to move away from its serving base station, i.e. heading to a neighbouring radio cell served by a further base station. In this case, it might be advantageous to limit a tilt angle to be implemented by the first base station's antenna system so as to reduce inter-cell interference which could be introduced by directing a main lobe of the antenna system's beam pattern to the neighbouring radio cell. Thus, even if the feedback information provided by a terminal positioned at the cell border would require to provide a specific first tilt angle by the base station, it might be advantageous to limit the tilt angle which is actually implemented to such values which ensure that an amount of inter-cell interference is kept below a predetermined threshold value.

However, for the uplink data transmission case, the base station may implement said first tilt angle, i.e. the desired tilt angle as derived from the phase shift measurements of the terminal, because due to the uplink transmission scenario, it is ensured that no inter-cell interference is produced with respect to the neighbouring cell, and moreover, the distance to the neighbouring base station is comparatively large so that the first base station will not receive too much interfering signals from the cell border region.

According to a further embodiment, the base station is configured to periodically transmit said pilot signals, wherein a time interval between two subsequent transmissions of pilot signals from the same antenna element ranges between about 1 millisecond and about 20000 milliseconds, preferably between 10 milliseconds and 1000 milliseconds. As already explained above, when employing time-multiplexed transmission of different pilot signals, it is advisable to transmit subsequent pilot signals via different antenna elements without substantial delays in between in order to minimize a phase error which might be introduced by a nonvanishing relative speed between the base station and the terminal. However, as far as different subsequent cycles of transmission of a plurality of pilot signals are concerned, it is sufficient to repeat such cycles within e.g. 10 milliseconds or even larger intervals such as up to 1000 milliseconds or more. One cycle of pilot signals advantageously ensures that the terminal is enable to recover phase information which can be employed to determine a desired tilt angle. However, due to the trigonometric relationship between the desired tilt angle and a phase delay between pilot signals received from different antenna elements, a time period between subsequent pilot signal cycles may well be in the 1000 millisecond range because in the case of low relative speeds between the base station and the terminal, no substantial deviation from the optimum tilt angle is to be expected between subsequent pilot signal cycles.

Thus, it is sufficient to perform the method steps according to the embodiments from time to time, e.g. within a 1000 milliseconds cycle to enable a sufficiently precise determination of optimum tilt angles. Advantageously, larger pilot signal cycle times enable increased transmission capacity for user data.

A further solution to the object of the present invention is given by a terminal for a cellular communications network according to claim 11. The terminal is configured to determine a phase shift between said pilot signals and to transmit feedback information to said base station, wherein said feedback information depends on or characterizes said phase shift between said pilot signals as determined by said terminal. This advantageously enables the base station to implement a tilt angle for future data communications with the terminal that lead to optimum signal quality. Advantageously, the base station may determine and/or implement specific tilt angle values for individual terminals or groups of terminals which are co-located within the radio cell served by the base station based on the phase shift measurements.

According to a further embodiment, the terminal is configured to transmit determined phase shifts between received pilot signals to the base station. Within this embodiment, the amount of signal processing related to the determination of the tilt angle within the terminal is minimized. However, based on the received phase shift information from the terminal, the base station has to evaluate the desired tilt angle for future communication with the respective terminal based on geometrical properties of the antenna system (i.e., vertical distance of neighbouring antenna elements).

Alternatively or in addition, the terminal may be configured to determine a desired tilt angle for downlink/uplink transmissions from the base station to the terminal depending on the phase shift(s) and to transmit the desired tilt angle value(s) to the base station. In this case, consequently, the terminal is to perform the respective calculations which require the terminal to comprise information on the parameters of the antenna system used by the base station (e.g. vertical distance of neighboring antenna elements).

According to a further embodiment, the terminal may also be configured to determine an index value denoting one of a plurality of predefined tilt angle values that may be used by the base station that relates to the determined phase shift and transmit the index value to the base station. In contrast to transmitting determined phase shift values or a determined tilt angle, the index value only requires a reduced amount of transmission capacity in the uplink direction. However, compared to the mere transmission of determined phase shifts to the base station, an increased degree of signal processing within the terminal is required.

According to a further embodiment, the terminal is configured to receive further pilot signals from a further base station of said cellular communications network, to determine a phase shift between said further pilot signals, and to transmit feedback information depending on said further phase shift(s) to said base station. In other words, the basic principle of the embodiments is not only applied to the pilot signals received by the terminal from its serving base station, but also to pilot signals received from neighbouring base stations. This advantageously enables the terminal to identify tilt angles of the neighbouring base stations which are undesired in that they lead to interference effects (inter-cell interference) due to transmissions from the neighbouring base station to the terminal. After receiving such feedback information, the serving base station of the terminal may exchange scheduling information with its neighbouring base station, i.e. by notifying the neighbouring base station not to use specific tilt angles which result in said inter-cell interference as reported by the terminal.

Further solutions to the objects of the present invention are given by a method of operating a base station according to claim 14 and a method of operating a terminal according to claim 15.

BRIEF DESCRIPTION OF THE FIGURES

Further aspects, features and embodiments of the present invention are given in the following detailed description, with reference to the drawings in which.

DESCRIPTION OF THE EMBODIMENTS

Figure 1:
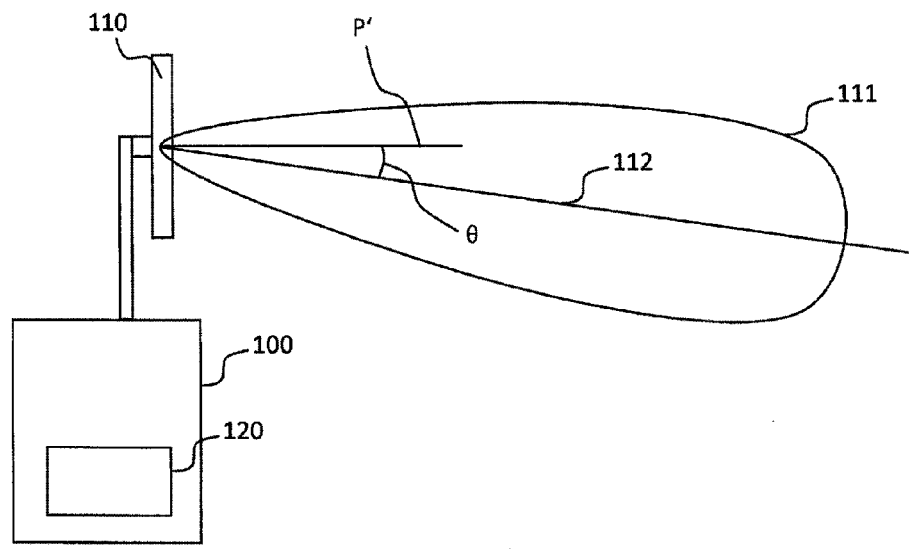
FIG. 1 depicts a simplified block diagram of a base station according to an embodiment.

FIG. 1 depicts a simplified block diagram of a base station 100 of a cellular communications network. The base station 100 may serve a number of terminals (not shown) such as mobile user terminals by maintaining respective data communication sessions in a per se known manner. For instance, the base station 100 may operate according to at least one of the following standards: GSM (Global System for Mobile Communications), UMTS (Universal Mobile Telecommunications System), LTE (Long Term Evolution)/LTE advanced, WiMax (Worldwide interoperability for Microwave Access), WLAN (Wireless Local Area Network).

The base station 100 comprises an antenna system 110, a characteristic beam pattern of which is symbolized by the shape ill. According to an embodiment, the antenna system 110 may be electronically controlled to reconfigure its beam pattern 111 or at least a direction of the main lobe of the beam pattern 111 along which the main lobe's axis 112 extends on a per terminal basis. I.e., the tilt angle θ of the antenna system 110, more precisely of its main lobe 111, which—as can be gathered from FIG. 1—is defined as the angle between the main lobe's axis 112 and a virtual horizontal plane P', can be electronically controlled, preferably individually for each terminal. This is e.g. accomplished by the processing means 120 which also control the basic operation of the base station 100 in a per se known manner. Moreover, the processing means 120 may also be configured to perform the method according to the embodiments explained below with reference to the further figures. Although the processing means are symbolized by a function block 120 which is arranged within the base station 100 in the context of the present exemplary embodiment, it is also possible to provide at least a part of the functionality of the processing means 120 within a further functional unit (not shown), that may e.g. be located close to the antenna system 110, such as e.g. a feeder network or the like.

Figure 2:
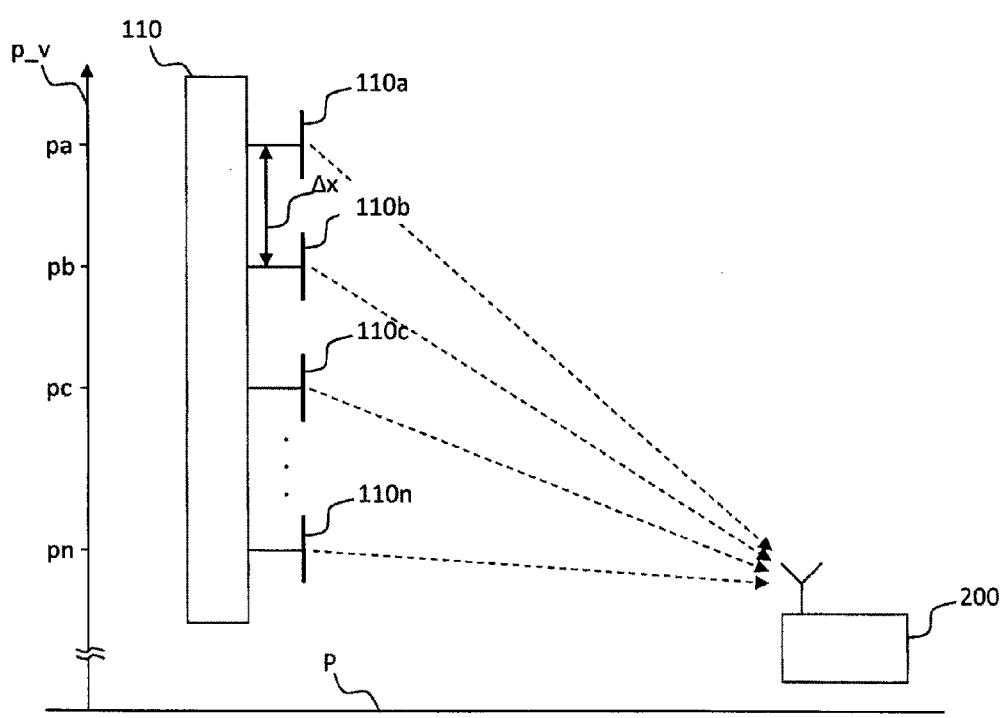
FIG. 2 depicts a simplified block diagram of an antenna system of a base station according to a further embodiment.

FIG. 2 depicts a detailed view of the antenna system 110 according to the embodiments. The antenna system 110 comprises n many single antenna elements 110a, 110b, 110c, . . . , 110n which may e.g. be designed as dipole antenna elements. A feeder network (not shown) may also be provided with the antenna system 110 which enables the base station 100 (FIG. 1) to individually provide each antenna element 110a, 110b, 110c, . . . , 110n of the antenna system 110 with a specific radio frequency signal to be transmitted via the respective antenna element.

As can be seen from FIG. 2, the antenna elements 110a, 110b, 110c, . . . , 110n of the antenna system 110 are arranged at different vertical positions pa, pb, pc, pn, which are listed on a vertical position axis p_v for illustration purposes. The vertical distance Δx between the different antenna elements may e.g. be defined with respect to a virtual horizontal plane P that is also depicted by FIG. 2.

In the context of the present invention, the term "antenna element" is defined as either one single dipole or a small group of dipoles or other types of antenna structures, instead of dipoles. Generally, a dipole can exhibit different polarization directions. Especially a pair of two cross-polarized dipoles can also be understood as "antenna element" in the context of the present invention. In contrast, antennas which form conventional antenna systems, e.g. for horizontal beam forming, are not "antenna elements" in the sense of this description. Such conventional antennas are already groups of vertically arranged antenna elements, which usually cannot be fed independently.

FIG. 2 further depicts a terminal 200 which may be served by the base station 100 (FIG. 1) that controls the antenna system 110. As can be seen from FIG. 2, due to their vertical orientation relative to each other, a connecting line between the single antenna elements 110a, 110b, 110c, . . . , 110n to the receiving antenna of the terminal 200 comprises different lengths for the different antenna elements, cf. the dashed arrows of FIG. 2.

As a consequence, a signal which is e.g. transmitted via the second antenna element 110b of the antenna system 110 to the terminal 200 comprises a phase shift relative to a signal which is transmitted from the first antenna element 110a of the antenna system 110 to the terminal 200. I.e., the respective received signals at the terminal 200 comprise a phase shift to each other which corresponds to the distance between the antenna of the terminal 200 and the respective antenna elements 110a, 110b. The phase shift between the signals received by the terminal's antenna from the antenna elements 110a, 110b of the base station 100 is related to the vertical distance Δx between the neighbouring antenna elements 110a, 110b and a distance between the terminal 200 and the antenna system 110 in a per se known manner. The distance between the elements 110, 200 may also be determined, e.g. by the base station 100, in a per se known manner, for instance by evaluating timing advance data or "signal roundtrip delays" or the like.

When operating the base station 100 (FIG. 1), it is advantageous to provide a nonzero tilt angle θ (also denoted as "downtilt") in order to optimally supply a specific terminal 200 (FIG. 2) with a specific RF downlink signal used for data transmission. For instance, if the terminal 200 is very close to the base station 100, a large tilt angle θ may be advantageous, whereas, for situations where the terminal 200 is comparatively far away from the base station 100, a smaller tilt angle θ is sufficient. As already explained above, the tilt angle θ is controlled by the base station 100 or its control unit 120, respectively, by providing individual RF transmit signals to the various antenna elements 110a, 110b, . . . in a per se known manner.

For determining a specific tilt angle value which should be used when communicating with a specific terminal 200, according to the embodiments, the base station 100 transmits specific pilot signals to the terminal 200 in a way explained below which enable the terminal 200 to derive information on an optimum tilt angle.

The base station 100 is configured to transmit specific pilot signals on orthogonal radio resources associated with said specific pilot signals via different antenna elements. This way, i.e. by transmitting different pilot signals via different antenna elements of the antenna system 110 (FIG. 2), it is ensured that the terminal 200, which receives said pilot signals, can recover the different pilot signals together with their phase information, which enables the terminal 200 and/or the base station 100 to derive an optimum tilt angle for future downlink transmissions therefrom.

For instance, a first pilot signal may be transmitted by the base station 100 via the first antenna element 110a to the terminal 200, whereas a second pilot signal may be transmitted from the base station 100 via the second antenna element 110b to the terminal 200. Since the terminal 200 knows all pilot signals that may be used by the base station 100, it can detect the pilot signals and determine a phase difference between those (at least two) pilot signals. The so determined phase difference comprises information on an optimum tilt angle which is to be implemented by the antenna system 110 to optimally supply the terminal 200 with a downlink signal, e.g. to direct the main axis of radiation 112 (FIG. 1) of the antenna system 110 to the position of the terminal 200.

According to a particularly preferred embodiment, said base station 100 is configured to transmit a first pilot signal on a first radio resource via a first antenna element 110a, and a second pilot signal on a second radio resource, which is orthogonal to said first radio resource, via a second antenna element 110b. The orthogonality of the radio resources is advantageous in that it enables the terminal 200 to recover the respective pilot signals originating from different antenna elements 110a, 110b while maintaining their phase relationship thus enabling to efficiently determine an optimum tilt angle θ.

According to a particularly preferred embodiment, a transmission time slot may be employed as orthogonal radio resource by the base station 100.

Figure 3:
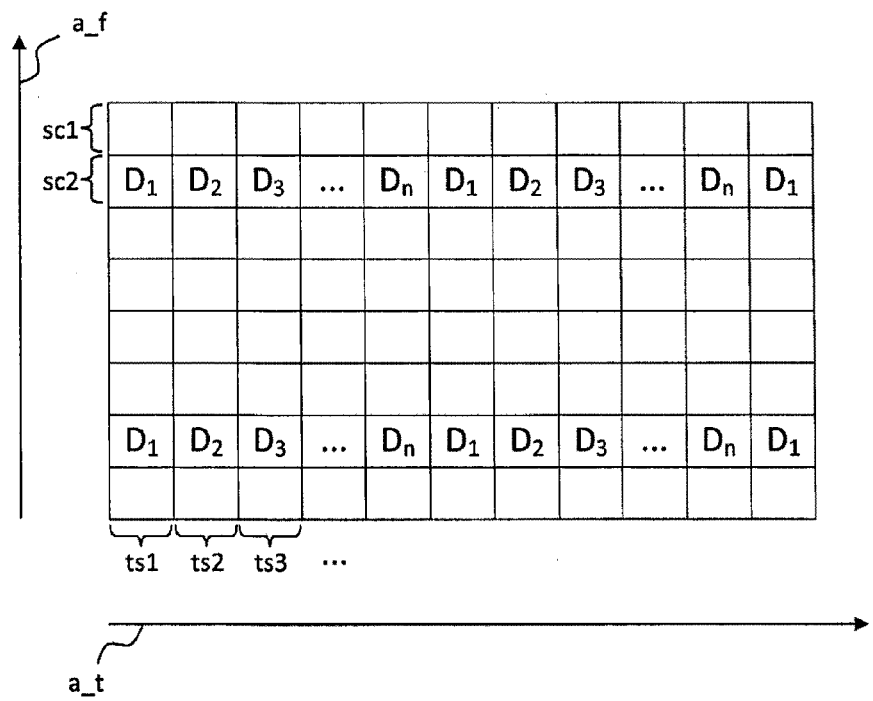
FIG. 3 depicts a time/frequency radio resource map according to a further embodiment.

For instance, if the base station 100 and the terminal 200 operate according to an orthogonal frequency division multiplex (OFDM) system with time-frequency-resources as exemplarily depicted by FIG. 3, a first pilot signal may be transmitted from the base station 100 to the terminal 200 via a first time slot ts1 and a first antenna element 110a (FIG. 2), whereas a second pilot signal may be transmitted from the base station 100 to the terminal 200 via a further, different antenna element 110b in the second, i.e. subsequent, transmission time slot ts2.

Generally, the time-frequency-resource map of FIG. 3 depicts on a time axis a_t the various subsequent time slots ts1, ts2, ts3, ..., whereas frequency subcarriers are symbolized by the scheme of FIG. 3 in a row-type-fashion, i.e. each row of the table depicted by FIG. 3 corresponds with a specific frequency subcarrier as indicated by the frequency axis a_f. For instance, the scheme according to FIG. 3 depicts a total number of eight frequency subcarriers sc1, sc2, ... only two of which are explicitly designated for the sake of clarity.

According to a preferred embodiment, in a first downlink transmission time slot ts1, the base station 100 (FIG. 1) transmits a first pilot signal $D_1$ on the second subcarrier sc2 and the seventh subcarrier. This transmission is effected e.g. via the first antenna element 110a of the antenna system 110 (FIG. 2).

Subsequently, in the following downlink transmission time slot ts2, a second pilot signal $D_2$ is transmitted from the base station 100 to the terminal 200 via a different antenna element, e.g. the second antenna element 110b. As can be seen from FIG. 3, within the second transmission time slot ts2, the same subcarriers (second and seventh frequency subcarrier) are used for transmission of the respective second pilot signal $D_2$ to the terminal 200.

After receiving the first and second pilot signals $D_1$, $D_2$, which e.g. can be represented by the dashed arrows of FIG. 2 extending from the antenna elements 110a, 110b to the antenna of the terminal 200, the terminal 200 can advantageously evaluate the phase difference between the received known pilot signals $D_1$, $D_2$. Upon determining the phase difference, the terminal 200 may directly return said phase shifts (phase differences) between the received pilot signals $D_1$, $D_2$ to the base station 100 in the sense of feedback information. From such feedback information, the base station 100 may calculate an optimum downtilt $\theta$ which should be used for a data transmission to the terminal 200 for ensuring minimized relative phase shifts between different signals transmitted from each of the antenna elements 110a, 110b to the terminal 200, i.e. aligning the main direction of propagation of the main lobe 111 (FIG. 1) with the direction of the terminal 200 in a vertical dimension. The details of determining the optimum downtilt $\theta$ depending on a phase shift of different pilot signals as detected by the terminal 200 and on the vertical distance $\Delta x$ of neighboring antenna elements 110a, 110b, ... are based on elementary trigonometry and thus not presented in this context.

Alternatively or in addition to transmitting the determined phase shift information to the base station 100, the terminal 200 may also determine a desired tilt angle $\theta$ for downlink transmissions from the base station 100 to the terminal 200 depending on the phase shift itself and may transmit such desired tilt angle to the base station 100. In this case, the base station 100 is only required to implement the respective tilt angle by means of its antenna system 110.

Alternatively or additionally, the terminal 200 may also determine an index value denoting one of a plurality of predefined tilt angle values that are both known to the base station 100 and the terminal 200 and that relate to the determined phase shift. The terminal may transmit such index value to the base station 100 to notify the base station 100 of the specific tilt angle to be implemented for future data transmissions.

According to a further advantageous embodiment, said base station 100 is configured to transmit a first pilot signal via a first antenna element 110a of the antenna system 110 using a first spreading code, and to transmit a second pilot signal via a second antenna element 110b using a second spreading code, which is orthogonal to said first spreading code, wherein said first and second pilot signals are preferably transmitted simultaneously. Since orthogonal coding also allows for recovering phase (shift) information of so coded pilot signals at the terminal 200, it can also be employed as "orthogonal radio resource" in the sense of the present invention for providing the terminal 200 with the phase information required to determine an optimum downtilt.

According to a further embodiment, the first pilot signal $D_1$ (FIG. 3) may be identical to the second pilot signal $D_2$. However, as both the base station 100 and the terminal 200 comprise information on the characteristic parameters of the pilot signals $D_1$, $D_2$, the pilot signals $D_1$, $D_2$ may also be different from each other.

As can be seen from FIG. 3, it is also possible to employ more than two pilot signals $D_1$, $D_2$. More specifically, the time-frequency-resource map of FIG. 3 depicts radio resource allocations for n many pilot signals $D_1$, ..., $D_n$ which are—according to a further embodiment—alternately transmitted to the terminal 200 (FIG. 2) by using different antenna elements 110a, 110b, 110c, ... 110n, each. I.e., the first pilot signal $D_1$ is transmitted via the first antenna element 110a during a first time slot ts1, the second pilot signal $D_2$ is transmitted via the second antenna element 110b during a second time slot ts2, and so on. Thus, after n time slots, the first pilot signal $D_1$ would again be transmitted by the first antenna element 110a. When using an OFDM system, of course, it is also possible to employ only one subcarrier or a larger number of subcarriers for transmitting the pilot signals.

According to a further preferred embodiment, the base station 100 is configured to periodically transmit pilot signals, wherein a time interval between two subsequent transmissions of pilot signals from the same antenna element 110a ranges between about 1 millisecond and about 20000 milliseconds, preferably between 10 milliseconds and 1000 milliseconds.

As already explained above, when employing time-multiplexed transmission of different pilot signals, it is advisable to transmit subsequent pilot signals $D_1$, $D_2$, ... via different antenna elements 110a, 110b, ... without substantial delays in between in order to minimize a phase error which might be introduced by a nonvanishing relative speed between the base station 100 and the terminal 200. However, as far as different subsequent cycles of transmission of a plurality of pilot signals are concerned, it is sufficient to repeat such cycles within e.g. 10 milliseconds or even larger intervals such as up to 1000 milliseconds or more. One cycle of pilot signals advantageously ensures that the terminal 200 is enable to recover phase information which can be employed to determine a desired tilt angle. However, due to the trigonometric relationship between the desired tilt angle and a phase delay between pilot signals received from different antenna elements, a time period between subsequent pilot signal cycles may well be in the 1000 millisecond range because in the case of low relative speeds between the base station and the terminal, no substantial deviation from the optimum tilt angle is to be expected between subsequent pilot signal cycles.

Thus, it is sufficient to perform the method steps according to the embodiments from time to time, e.g. within a 1000 milliseconds cycle to enable a sufficiently precise determination of optimum tilt angles. Advantageously, larger pilot signal cycle times enable increased transmission capacity for user data.

It is to be noted that the inventive principle may also be applied within mere time multiplexing systems. Such system would e.g. provide for numerous subsequent time slots ts1, ts2, ... which may be used for downlink transmissions of pilot signals. Insofar, a mere time multiplexing system may comprises a radio resource scheme which corresponds to one row of the OFDM scheme as depicted by FIG. 3, i.e. there are various subsequent time slots, but only on (sub)carrier for downlink transmissions. In a mere time multiplexing system, the inventive steps of transmitting specific pilot signals via different antenna elements 110a, 110b, ... would thus be performed one after another, i.e. one pilot signal per time slot. After receiving at least two pilot signals from two different antenna elements 110a, 110b of the antenna system 110, the terminal 200 may determine a respective phase shift and calculate a corresponding optimum tilt angle. Alternatively, the terminal 200 may also forward the determined phase shift to the base station 100 in an uplink transmission, and the base station 100 may calculate the optimum tilt angle itself. When applying the inventive principle to time multiplexing systems, it is important to only transmit one specific pilot signal per time slot to enable a terminal 200 to recover the associated phase information of the pilot signals.

In contrast, within OFDM systems, where different frequency subcarriers may be employed as orthogonal radio resources, different pilot signals may be transmitted on different frequency subcarriers within the same time slot, i.e. simultaneously. Due to the OFDM principle, the terminal 200 may nevertheless correctly recover the phase information of all involved pilot signals.

Alternative or additionally, code multiplexing techniques may also be employed for transmitting the pilot signals to the terminal 200.

To ensure that the terminal 200 is supplied with signal phase shift information that depends on the vertical distance $\Delta x$ of at least two antenna elements 110a, 110b of the antenna system 110, it is important that at least two pilot signals are transmitted via said different antenna elements 110a, 110b, respectively. Otherwise, i.e. by only using the same antenna element 110a for all pilot signal transmissions, the optimum tilt angle could not be derived.

According to a further advantageous embodiment, the terminal 200 (FIG. 2) is configured to determine a phase shift between at least two received pilot signals $D_1$, $D_2$ and to transmit feedback information to said base station 100, wherein said feedback information depends on or characterizes said phase shift between said pilot signals as determined by said terminal 200. This advantageously enables the base station 100 to implement a tilt angle $\theta$ for future data communications with the terminal 200 that lead to optimum signal quality. Advantageously, the base station 100 may determine and/or implement specific tilt angle values for individual terminals 200 or groups of terminals which are co-located within the radio cell served by the base station 100 based on the phase shift measurements.

According to a further embodiment, the terminal 200 is configured to transmit determined phase shifts between received pilot signals to the base station 100. Within this embodiment, the amount of signal processing related to the determination of the tilt angle within the terminal 200 is minimized. However, based on the received phase shift information from the terminal 200, the base station 100 may evaluate the desired tilt angle for future communication with the respective terminal 200 based on geometrical properties of the antenna system (i.e., vertical distance of neighboring antenna elements) and elementary trigonometry.

Alternatively or in addition, the terminal 200 may be configured to determine a desired tilt angle for downlink/uplink transmissions from/to the base station 100 depending on the phase shift(s) and to transmit the desired tilt angle value(s) to the base station 100. In this case, consequently, the terminal 200 is to perform the respective calculations which require the terminal 200 to comprise information on the parameters of the antenna system 110 used by the base station 100 (e.g. vertical distance of neighboring antenna elements).

According to a further embodiment, the terminal 200 may also be configured to determine an index value denoting one of a plurality of predefined tilt angle values that may be used by the base station 100 that relates to the determined phase shift and transmit the index value to the base station 100. In contrast to transmitting determined phase shift values or a determined tilt angle, the index value only requires a reduced amount of transmission capacity in the uplink direction. However, compared to the mere transmission of determined phase shifts to the base station 100, an increased degree of signal processing within the terminal 200 is required for determining said index value.

According to a further embodiment, the terminal 200 is configured to receive further pilot signals from at least one further base station (not shown) of said cellular communications network, to determine a phase shift between said further pilot signals, and to transmit feedback information depending on said further phase shift(s) to said base station 100. In other words, the basic principle of the embodiments is not only applied to the pilot signals received by the terminal 200 from its serving base station 100, but also to pilot signals received from neighbouring base stations (not shown). This advantageously enables the terminal 200 to identify tilt angles of transmissions from the neighbouring base stations which are undesired in that they lead to interference effects (inter-cell interference) due to transmissions from the neighbouring base station to the terminal 200. After receiving such feedback information, the serving base station 100 of the terminal 200 may exchange scheduling information with its neighbouring base station, i.e. by notifying the neighbouring base station not to use specific tilt angles which result in said inter-cell interference as reported by the terminal 200.

The inventive principle advantageously enables the base station 100 to implement optimum tilt angles on a per terminal basis. I.e., by applying the method according to the embodiments, a base station 100 may determine an optimum downtilt for each terminal 200 it serves. Said optimum downtilt may both be used for downlink and uplink transmission due to reciprocity of the radio channel.

However, according to a further embodiment, it may also be advantageous to use different tilt angle values for uplink transmissions and downlink transmissions with a specific terminal 200. For instance, if a terminal 200 currently served by a first base station 100 is roaming within the radio cell provided by the base station 100, the terminal 200 may happen to move away from its serving base station 100, i.e. heading to a neighbouring radio cell served by a further base station. In this case, it might be advantageous to limit a tilt angle $\theta$ to be implemented by the first base station's antenna system 110 so as to reduce inter-cell interference which could be introduced by directing the main lobe 111 (FIG. 1) of the antenna system's beam pattern to the neighbouring radio cell. Thus, even if the feedback information provided by a terminal 200 positioned at the cell border would require to provide a specific first tilt angle by the base station 100, it might be advantageous to limit the tilt angle which is actually implemented to such values which ensure that an amount of intercell interference is kept below a predetermined threshold value.

However, for the uplink data transmission case, the base station 100 may implement said first tilt angle, i.e. the desired tilt angle as derived from the phase shift measurements of the terminal 200, because due to the uplink transmission scenario, it is ensured that no inter-cell interference is produced with respect to the neighbouring cell, and moreover, the distance to the neighbouring base station is comparatively large so that the first base station 100 will not receive too much interfering signals from the cell border region.

The inventive principle may be applied to any antenna system 110 comprising at least two vertically spaced antenna elements 110a, 110b that may individually be controlled for RF transmissions. However, if there are more than two elements, a correspondingly increased number of pilot signals may be used, which also leads to an increased number of phase shift values to be evaluated at the terminal 200.

The invention can be applied as well if the base station 100 is equipped with more than one single column of dipoles 110a, 110b, . . . , 110n, i.e. if an antenna array for MIMO (Multiple Input Multiple Output) or horizontal beamforming is available. In this case, either the array columns are used alternately for the pilot transmission, or only one specific array column is used for this purpose as explained above with reference to the antenna system 110.

According to a further advantageous embodiment, the downtilt information can be derived on a long term or statistical basis. The pilot signals used for vertical downtilt estimation according to the embodiments need not be sent e.g. in each frame of an OFDM system, since the vertical antenna beam 111 is generated by correlated antenna elements and the downtilt is varying slowly even in the mobility case, i.e. with a moving terminal 200. So the needed pilot overhead can be kept moderate.

A further advantageous embodiment proposes vertical beam steering with a set of fixed vertical beams. The base station 100, which may e.g. be configured as an eNB of an LTE system, transmits pilot tones $D_1$, $D_2$, $D_n$ on dedicated time-frequency resources (cf. FIG. 3). It is assumed that a set of predefined vertical beamforming vectors is given (e.g. by standardisation), each realizing a predefined downtilt. For instances, eight different downtilt values may be defined and may be addressed by employing a control data word having three bits.

The terminal 200, which may be an LTE capable user equipment device (UE), receives the pilot tones transmitted by the eNB 100 and evaluates the phase offsets between these tones. From this, the terminal 200 can estimate the best suited vertical beamforming vector. The terminal 200 reports the index (three bit) of the vertical beamforming vector, which is closest to the ideal vector, to the eNB 100 as feedback information, which may e.g. constitute a part of the uplink control signalling. The closest (best suited) vector is that one exhibiting the smallest phase offsets when applied to the received pilot tones under the assumption that $D_1$, $D_2$, . . . , $D_n$ are sent without any mutual phase offsets at the antenna system 110.

After determining the best beamforming vector for each terminal 200 served, the eNB 100 applies the UE-specific vertical beamforming vectors for the downlink transmissions to the respective terminals 200. In practice this means that each terminal 200 may be served with a vertical antenna beam 111 that complies with its current location within the cell. Data signal components originating from different antenna elements (i.e., dipoles) will add up almost coherently at the respective receiver when applying this specific vertical beamforming vector.

Further, the eNB 100 can exploit the fed back vector indices for an appropriate scheduling of the terminals 200, in particular for Coordinated Multi Point (CoMP) techniques that aim in avoiding mutual interference between UEs in adjacent cells. In this case, vector indices from cooperating eNBs 100 have to be exchanged and considered for the scheduling decisions.

According to a further advantageous embodiment, which provides explicit feedback of the appropriate downtilt from the terminal 200 to the base station 100, if a certain feedback capacity in the uplink is available, each terminal 200 can determine its appropriate downtilt and feed back this value directly instead of a vector index as explained for the preceding embodiment.

The ideal downtilt can again be calculated from the measured phase offsets $\Delta\phi$ of the received pilot tones, the known phase offsets of the pilot signals $D_1$, $D_2$, . . . , $D_n$ at the antenna system 110, the known vertical distance $\Delta x$ (an attribute of the base station antenna hardware) and, if applicable, the applied constant mechanical downtilt of the base station antenna 110. The latter information can be merged with the mutual phase offsets between the pilot signals $D_1$, $D_2$, . . . , $D_n$, and an explicit knowledge of this value at the terminal 200 is not required. I.e., the base station 100 adapts the phases of the pilot signals $D_1$, $D_2$, . . . , $D_n$ such that the effect of an eventually applied mechanical downtilt to the antenna system 110 is fully compensated at the receiving terminal 200. In the case that the eNB 100 operates with a limited number of fixed beams (i.e., several constant downtilt values may be used), the desired downtilt reported from the terminal 200 is then mapped to the most adequate one of the fixed beams available at the eNB 100. For example, if two fixed beams with downtilts of 5° and 10° are defined at the eNB 100, and the terminal 200 reports a required downtilt of 8°, then the beam with 10° will be applied for this terminal 200 by the eNB 100.

Generally, by applying the principle according to the embodiments, the eNB 100 is able to serve the UEs 200 exactly with the reported downtilt and is not limited to a set of fixed downtilts.

According to yet another embodiment, explicit feedback of phase shifts between received pilot tones may be reported to the eNB 100. If the antenna hardware parameter $\Delta x$ is not known at the terminal 200, the following alternative solution can be applied: The terminal 200 measures and reports the phase shifts between several received pilot signals to the eNB 100. The eNB 100 applies corresponding inverse phase shifts to RF signals to be transmitted from different antenna elements to compensate the phase shifts as reported from the terminal 200. Hence, the effect of non-coherent superposition, i.e., without aligned phase, of signals originating from different dipoles (antenna elements) at the terminal 200 (i.e., case of a non-ideal downtilt) is compensated without explicitly knowing the antenna hardware parameters and the actually applied downtilt in degree.

Based on the present embodiments, known techniques for coordination between neighbouring base stations (e.g., eNBs) to avoid mutual interference can advantageously be enhanced.

Figure 4:
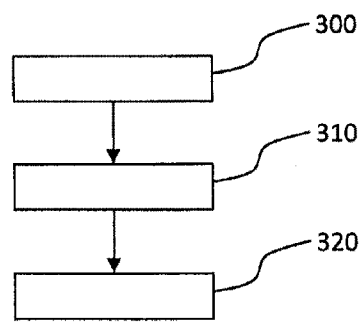
FIG. 4 depicts a simplified flow chart of a method of operating a base station according to an embodiment.

The abovementioned embodiments advantageously enable a base station 100 to serve its terminals 200 with an appropriate, i.e. optimized, downtilt. This is achieved by the following consecutive steps:
transmitting pilot signals D1, D2 on orthogonal radio resources associated with said specific pilot signals D1, D2 via different antenna elements 110a, 110b, cf. step 300 of the flow chart of FIG. 4,
at least one terminal 200 receives and evaluates the pilot signals D1, D2, cf. step 310 of FIG. 4,
feedback information is transmitted (step 320 of FIG. 4) from the terminal 200 to the base station 100 allowing the base station 100 to adapt the downtilt appropriately for said at least one terminal 200.

According to further embodiments, this basic scheme can be extended as follows:

Terminal 200 receives and evaluates pilot tones originating from its serving eNB 100 as well as originating from other neighbouring eNBs (not shown). Feedback from terminal 200 to its serving base station 100 consisting of information related to measurements of pilot tones originating from serving eNB and/or neighbouring eNBs. E.g. this information can be the preferred vertical beamforming weights for transmissions dedicated to said terminal 200 from its serving eNB 100 and/or weights that cause maximal interference with terminal 200 when applied at the neighbouring eNB. By exchanging this information among eNBs, scheduling decisions and downtilt adaptations can be coordinated to avoid mutual interference. Alternatively, the terminal 200 can measure and report the interference signal strength on pilot tones originating from neighbouring eNBs. The serving eNB 100 can consider this knowledge for its scheduling decisions and exploit it for known interference coordination techniques.

The dynamic vertical beamforming enabled by the present invention with UE-specific downtilt is an important way to reduce inter-cell interference and therefore increase the spectral efficiency. A prerequisite is knowledge about appropriate beamforming weights at the base station 100. The invention at hand shows a simple method how to obtain these weights with assistance of a terminal 200. The inventive principle can be applied very generally in wireless communication systems for Frequency Division Duplex (FDD) and Time Division Duplex (TDD) and further systems such as CDMA systems.

Generally, the embodiments may also be employed for antenna systems which already comprise a nonvanishing (fixed) mechanical downtilt. In this case, the usually known mechanical downtilt, which e.g. depends on mounting conditions of the antenna hardware, is to be taken in consideration when evaluating a downtilt to be implemented by the base station.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labelled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A base station for a cellular communications network, comprising:
   at least one antenna system which comprises a plurality of antenna elements, wherein at least two antenna elements are arranged at different vertical positions with reference to a virtual horizontal plane; and
   a controller configured to control the at least one antenna system to transmit specific pilot signals on orthogonal radio resources associated with said specific pilot signals via different ones of said at least two antenna elements arranged at different vertical positions, wherein said controller is configured to receive feedback information from a terminal via the at least one antenna system, wherein said feedback information depends on or characterizes a phase shift between said pilot signals as detected by said terminal, wherein the controller is configured to control a tilt angle of the at least two antenna elements arranged at different vertical positions for at least one of downlink transmissions to said terminal and receipt of uplink transmissions from the terminal depending on said feedback information.

2. The base station according to claim 1, wherein said controller is configured to transmit a first pilot signal on a first radio resource via a first antenna element, and to transmit a second pilot signal on a second radio resource, which is orthogonal to said first radio resource, via a second antenna element.

3. The base station according to claim 1, wherein said controller is configured to employ at least one of the following resources as orthogonal radio resources:
   transmission time slots, subcarriers, and orthogonal codes.

4. The base station according to claim 1, wherein said controller is configured to transmit a first pilot signal via a first antenna element during a first downlink transmission time slot, and to transmit a second pilot signal via a second antenna element during a second downlink transmission time slot.

5. The base station according to claim 1, wherein said controller is configured to transmit a first pilot signal via a first antenna element on a first subcarrier.

6. The base station according to claim 1, wherein said controller is configured to transmit a first pilot signal via a first antenna element using a first spreading code, and to transmit a second pilot signal via a second antenna element using a second spreading code, which is orthogonal to said first spreading code.

7. The base station according to claim 2, wherein said first pilot signal is identical to said second pilot signal.

8. The base station according to claim 1, wherein said controller is configured to control the tilt angle for both downlink transmissions and uplink transmissions with said terminal depending on said feedback information, and to use different tilt angle values for uplink transmission and downlink transmissions.

9. The base station according to claim 2, wherein said controller is configured to periodically transmit said pilot signals via the at least one antenna system, wherein a time interval between two subsequent transmissions of pilot signals from the same antenna element ranges between about 1 millisecond and about 20000 milliseconds.

10. A terminal for a cellular communications network, wherein said terminal is configured to:
receive at least two pilot signals from a base station of said cellular communications network, wherein the at least two pilot signals were transmitted by the base station on orthogonal radio resources via different antenna elements, wherein the different antenna elements are arranged at different vertical positions with reference to a virtual horizontal plane;
determine a phase shift between said pilot signals; and
transmit feedback information to said base station, wherein said feedback information depends on or characterizes said phase shift between said pilot signals as determined by said terminal.

11. The terminal according to claim 10, wherein said terminal is configured to perform at least one of:
transmit the determined phase shifts between the received pilot signals to the base station;
determine a desired tilt angle for downlink transmissions from said base station to said terminal depending on said phase shift and transmit said desired tilt angle to the base station; and
determine an index value denoting one of a plurality of predefined tilt angle values that may be used by the base station and that relates to the determined phase shift and transmit said index value to the base station.

12. The terminal according to claim 10, wherein said terminal is configured to receive further pilot signals from a further base station of said cellular communications network, to determine a further phase shift between said further pilot signals, and to transmit feedback information depending on said further phase shift to said further base station.

13. A method of operating a base station for a cellular communications network, comprising:
controlling at least one antenna system of a base station of a cellular communications network in conjunction with operation of the base station, wherein the at least one antenna system comprises a plurality of antenna elements, wherein at least two antenna elements are arranged at different vertical positions with reference to a virtual horizontal plane;
transmitting specific pilot signals on orthogonal radio resources associated with said specific pilot signals from the base station via different ones of said at least two antenna elements arranged at different vertical positions;
receiving feedback information from a terminal of the cellular communications network at the base station, wherein said feedback information depends on or characterizes a phase shift between said pilot signals as detected by said terminal; and
controlling a tilt angle of the at least two antenna element arranged at different vertical positions for at least one of downlink transmissions to said terminal and receipt of uplink transmissions from the terminal depending on said feedback information.

14. A method of operating a terminal for a cellular communications network, comprising;
receiving at least two pilot signals from a base station of a cellular communications network at a terminal of said cellular communications network, wherein the at least two pilot signals were transmitted by the base station on orthogonal radio resources via different antenna elements, wherein the different antenna elements are arranged at different vertical positions with reference to a virtual horizontal plane;
determining a phase shift between said pilot signals at the terminal; and
transmitting feedback information from the terminal to said base station, wherein said feedback information depends on or characterizes said phase shift between said pilot signals as determined by said terminal.

15. The base station according to claim 4, wherein the second downlink transmission time slot is subsequent to the first downlink transmission time slot.

16. The base station according to claim 5, wherein the first and second pilot signals are transmitted simultaneously.

17. The base station according to claim 6, wherein the first and second pilot signals are transmitted simultaneously.

18. The base station according to claim 9, wherein the time interval between two subsequent transmissions of pilot signals from the same antenna element ranges between 10 milliseconds and 1000 milliseconds.

19. The method according to claim 13, further comprising:
transmitting a first pilot signal on a first radio resource from the base station via a first antenna element; and
transmitting a second pilot signal on a second radio resource from the base station via a second antenna element, wherein the second radio resource is orthogonal to the first radio resource.

20. The method according to claim 14, further comprising at least one of:
transmitting the determined phase shifts between the received pilot signals from the terminal to the base station;
determining a desired tilt angle for downlink transmissions from the base station to the terminal depending on the phase shift and transmitting the desired tilt angle from the terminal to the base station; and
determining an index value denoting one of a plurality of predefined tilt angle values that may be used by the base station and that relates to the determined phase shift and transmitting the index value from the terminal to the base station.

* * * * *